US012067897B2

(12) United States Patent
Wu et al.

(10) Patent No.: US 12,067,897 B2
(45) Date of Patent: Aug. 20, 2024

(54) TRAINING APPARATUS AND METHOD FOR FRACTURE REDUCTION (71) Applicant: INNER MONGOLIA MEDICAL UNIVERSITY, Hohhot (CN)

(72) Inventors: Qizhu Wu, Hohhot (CN); Galatai, Hohhot (CN); Yingsong Chen, Hohhot (CN); Agula, Hohhot (CN); Murigenjiya, Hohhot (CN); Changsheng Li, Hohhot (CN)

(73) Assignee: INNER MONGOLIA MEDICAL UNIVERSITY, Hohhot (CN)

( * ) Notice: Subject to any disclaimer, the term of this patent is extended or adjusted under 35 U.S.C. 154(b) by 722 days.

(21) Appl. No.: 17/290,238

(22) PCT Filed: Oct. 29, 2019

(86) PCT No.: PCT/CN2019/113869
§ 371 (c)(1),
(2) Date: Apr. 29, 2021

(87) PCT Pub. No.: WO2020/088430
PCT Pub. Date: May 7, 2020

(65) Prior Publication Data
US 2022/0020294 A1    Jan. 20, 2022

(30) Foreign Application Priority Data
Nov. 1, 2018 (CN) .......................... 201811294391.7
Nov. 1, 2018 (CN) .......................... 201821795706.1

(51) Int. Cl.
G09B 23/32    (2006.01)
G09B 9/00    (2006.01)

(52) U.S. Cl.
CPC ............... *G09B 23/32* (2013.01); *G09B 9/00* (2013.01)

(58) Field of Classification Search
CPC .................................. G09B 9/00; G09B 23/32
See application file for complete search history.

(56) References Cited

U.S. PATENT DOCUMENTS

| 4,605,373 A * | 8/1986 | Rosen | G09B 23/32 434/274 |
| 2004/0254771 A1* | 12/2004 | Riener | G09B 23/32 703/7 |
| 2004/0257021 A1* | 12/2004 | Chang | G05B 19/427 318/568.21 |

FOREIGN PATENT DOCUMENTS

CN    204246228 U  *  4/2015  ............. A61B 17/56

* cited by examiner

*Primary Examiner* — Kang Hu
*Assistant Examiner* — Correll T French
(74) *Attorney, Agent, or Firm* — Getech Law LLC; Jun Ye (57) ABSTRACT

A training device (1) for fracture reduction, comprising: a fracture reduction platform (20) having a base (202) and a robotic arm section (201) fixed on the base (202), the robotic arm section (201) being configured in such a manner that a limb model can be mounted thereon; and a control unit (30) coupled to the fracture reduction platform (20) and configured to simulate and present, based on the motion of the robotic arm section (201), the effect of the motion of the robotic arm section (201) on the limb model. Also provided is a training method for fracture reduction.

11 Claims, 7 Drawing Sheets

FIG. 7

TRAINING APPARATUS AND METHOD FOR FRACTURE REDUCTION

CROSS-REFERENCE TO RELATED APPLICATIONS

This application is a 371 of international Application No. PCT/CN2019/113869 filed Oct. 29, 2019, which claim priority to foreign Application No. CN201811294391.7, filed Nov. 1, 2018 and foreign Application No.: CN201821795706.1, filed Nov. 1, 2018. The contents of each of the above-captioned patent applications are hereby expressly incorporated herein by reference in their entireties.

TECHNICAL FIELD

The invention relates to a computer-assisted fracture reduction technology, and more particularly, to a training device and a training method for fracture reduction.

BACKGROUND

Nowadays, treatment of orthopedic diseases may include mainly manipulative reduction and external fixation. The manipulative reduction involves the reduction of fractures and dislocated joints with bare hand(s). For these reasons, the manipulative reduction techniques rely heavily on doctor's manipulations. The effect of fracture treatment may depend largely on whether the manipulative reduction is successful. A doctor with proficient manipulations can bring benefits to the patient by enabling an affected site to heal quickly, by promoting recover phase, and by reducing complications and sequelae.

However, a closure fracture reduction manipulation allows no direct viewing, but is done only through differentiation by palpating the injured area. The learning, training and proficiency of the manipulations have always been an arduous and long process. In the case of Mongolian Medicine Orthopedics, for example, it is impractical for a famous orthopedic doctor to teach every student in person, although this manipulation has been taught in college classrooms for more than 60 years. As a consequence, the teaching and learning of manipulations become a bottleneck due to lack of teaching resources as well as absence of well-designed training instrument to replace patients, resulting in a significant decline in the teaching effect in terms of manipulative techniques, for example. College students educated in colleges and universities exhibit poorer performance in some aspects as compared to an apprentice.

Therefore, a need exists for a teaching and training device and a training method capable of training manipulative skills so as to train students in performing the fracture reduction by using the manipulative skills in a more scientific, convenient and efficient manner.

The contents of the background are only the technology known to the inventor, and would not necessarily represent the prior art in the art.

SUMMARY

In view of above, a training device and a training method for fracture reduction capable of overcoming the defects in the prior art are proposed in the present invention.

According to an embodiment of the present invention, there is provided a training device for fracture reduction, including: a fracture reduction platform that includes a base and a robotic arm section fixed on the base, the robotic arm section being configured in such a manner that a limb model can be mounted thereon; and a control unit that is coupled to the fracture reduction platform and is configured to, based on a movement of the robotic arm section, simulate and present an effect of the movement of the robotic arm section on the limb model.

According to an embodiment of the present invention, the robotic arm section may include: a first robotic arm that is used to fix the limb model, the first robotic arm is provided with three swing joints and three rotation joints so as to move in any direction along three axes of a space; and a second robotic arm that is used to fix the limb model, the second robotic arm is provided with a swing joint and a rotation joint.

According to an embodiment of the present invention, the control unit may include a sensing module that is coupled to the robotic arm section and is configured to sense the movement of the robotic arm section.

According to an embodiment of the present invention, the control unit may further include: a display module that is coupled to the sensing module, and is configured to, based on the movement of the robotic arm section sensed by the sensing module, display a spatial movement of a fracture site of the limb model.

According to an embodiment of the present invention, the control device may further include: a recording and learning module that is configured to operate in a recording mode where the recording and learning module can store the movement of the robotic arm section as a template and in a learning mode where the recording and learning module can drive the robotic arm section to move according to the stored template According to an embodiment of the present invention, the training device may further include a motor coupled to the robotic arm section, and the recording and learning module may control the motor to drive the robotic arm section to move according to the template.

According to an embodiment of the present invention, the training device may further include a fracture model unit configured to store a fracture model corresponding to the limb model, and the control unit may simulate and present the effect of the movement of the robotic arm section on the limb model based on the fracture model and the movement of the robotic arm section.

According to an embodiment of the present invention, the training device may further include a limb model including a bone part and a soft tissue part, wherein the bone part includes at least one fracture site.

According to the present invention, there is further provided a training method using the training device for fracture reduction and restoration as described above, including: performing, by a first user, the fracture reduction operation on the fracture site of the limb model; and simulating and presenting the effect on the fracture site while the first user is performing the fracture reduction operation on the fracture site of the limb model.

According to an embodiment of the present invention, the presenting step may include: sensing the movement of the robotic arm section while the first user is performing the fracture reduction operation on the fracture site of the limb model.

According to an embodiment of the present invention, the training method may further include: storing, as a template, the movement of the robotic arm section while the first user is performing the fracture reduction operation.

According to an embodiment of the present invention, the training method may further include: driving the robotic arm section to move according to the stored template.

According to an embodiment of the present invention, wherein the presenting step may include: based on the sensed movement of the robotic arm, displaying the spatial movement of the fractured end of the fracture site of the limb model on the display module.

According to an embodiment of the present invention, the training method may further include: correcting the fracture reduction operation based on the displayed spatial movement of the fractured end of the fracture site of the limb model.

The training device and training method for fracture reduction according to the present invention can feed back the fracture reduction operation performed by the operator in real time, thereby greatly improving the effect of training the operator. Besides, the reduction manipulations of teachers, clinicians or famous doctors may be recorded and reproduced, and as a result, learners can repeatedly feel the sequential direction and strength of the manipulations, thereby effectively improving the training effect.

BRIEF DESCRIPTION OF DRAWINGS

The drawings constituting a part of the present invention are intended to offer a further understanding of the present invention. The exemplary embodiments of the present invention and the description thereof are used to explain the present invention, and do not constitute an improper limitation of the present invention. In the drawings.

DESCRIPTION OF EMBODIMENTS

In the following, only certain exemplary embodiments are briefly described. The described embodiments may be modified in various different ways without departing from the spirit or scope of the present invention, as appreciated by those skilled in the art. Therefore, the drawings and description should be regarded to be illustrative but not restrictive in nature.

Throughout the description of the present invention, it should be appreciated that the orientation or positional relationships indicated by the terms such as "center", "longitudinal", "transverse", "length", "width", "thickness", "upper", "lower", "front", "back", "left", "right", "vertical", "horizontal", "top", "bottom", "inner", "outer", "clockwise", "counterclockwise" and the like are based on the orientation or positional relationship illustrated in the drawings, and are only for the convenience of explaining the present invention and simplifying the description, but not indicate or imply that the referred device or element must be provided in a specific orientation, be constructed and operated in a specific orientation. Therefore, it shall not be regarded as a limitation to the present invention. In addition, the terms "first" and "second" are only used in a descriptive sense, and shall not be understood as indicating or implying relative importance or implicitly indicating the number of indicated technical feature(s). Therefore, the feature(s) defined with "first" and "second" may explicitly or implicitly include one or more of said feature(s). The term "plurality" means two or more throughout the description of the present invention, unless otherwise specifically defined.

It should be noted that the terms "installed", "connected", and "connection" should be interpreted broadly throughout the description of the present invention, unless otherwise clearly specified and limited. For example, it may be a fixed connection, a detachable connection or an integral connection. It may be a mechanical connection, or an electrical connection. Alternatively, communication between elements may be possible. It may be a direct connection, or an indirect connection by means of an intermediate medium. Moreover, internal communication of two elements or interaction of two elements is possible. For those of ordinary skill in the art, the specific meanings of the above-mentioned terms in the present invention can be understood according to specific situations.

In the present invention, unless otherwise clearly designated and defined, a first feature being "above" or "below" a second feature may cover the situations where the first and second features are in direct contact with each other, or where the first and second features are not in direct contact, but contacting by virtue of further features between them. Moreover, first feature being "above", "over" and "on" the second feature may cover the situations where the first feature is directly above and obliquely above the second feature, or it simply means that the level of the first feature is higher than that of the second feature. The first feature being "below", "under", and "underneath" the second feature may cover the situations where the first feature is directly below and obliquely below the second feature, or it simply means that the level of the first feature is lower than the second feature.

Many different embodiments or examples according to the following disclosure for implementing different structures of the present invention are presented. In order to simplify the disclosure of the present invention, the components and settings of specific examples will be described below. It is apparent that these are only examples, and are not intended to limit the present disclosure. In addition, according to the present invention, reference numerals and/or reference letters are repeated in different examples, and such repetition is for the purpose of simplification and clarity, and does not imply the relationship among the various embodiments and/or settings discussed. In addition, examples of various specific processes and materials are given in the present invention, but those of ordinary skill in the art may contemplate the applications of other processes and/or the use of other materials.

The preferred embodiments of the present invention will be described below with reference to the accompanying drawings. It should be understood that the preferred embodiments described herein are only intended to illustrate and explain the present invention, and are not used to limit the present invention.

Figure 1:
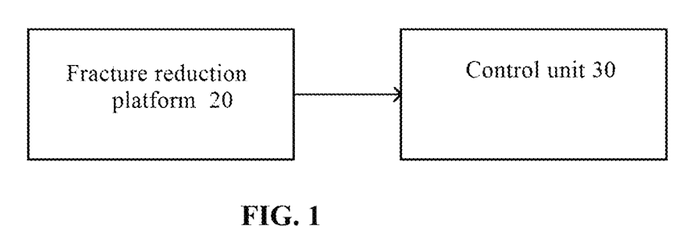
FIG. 1 is an exemplary block diagram of a training device for fracture reduction according to an embodiment of the present invention.

A training device 1 for fracture reduction according to an embodiment of the present invention is illustrated in FIG. 1.

As shown in FIG. 1, the training device 1 for fracture reduction may include: a fracture reduction platform 20 that may include a base and a robotic arm section fixed to the base, the robotic arm section is configured in such a manner that a limb model can be mounted thereon; and a control unit 30 that is coupled to the fracture reduction platform 20, and is configured to simulate and present the effect of the movement of the robotic arm section on the limb model based on the movement of the robotic arm section.

Figure 2:
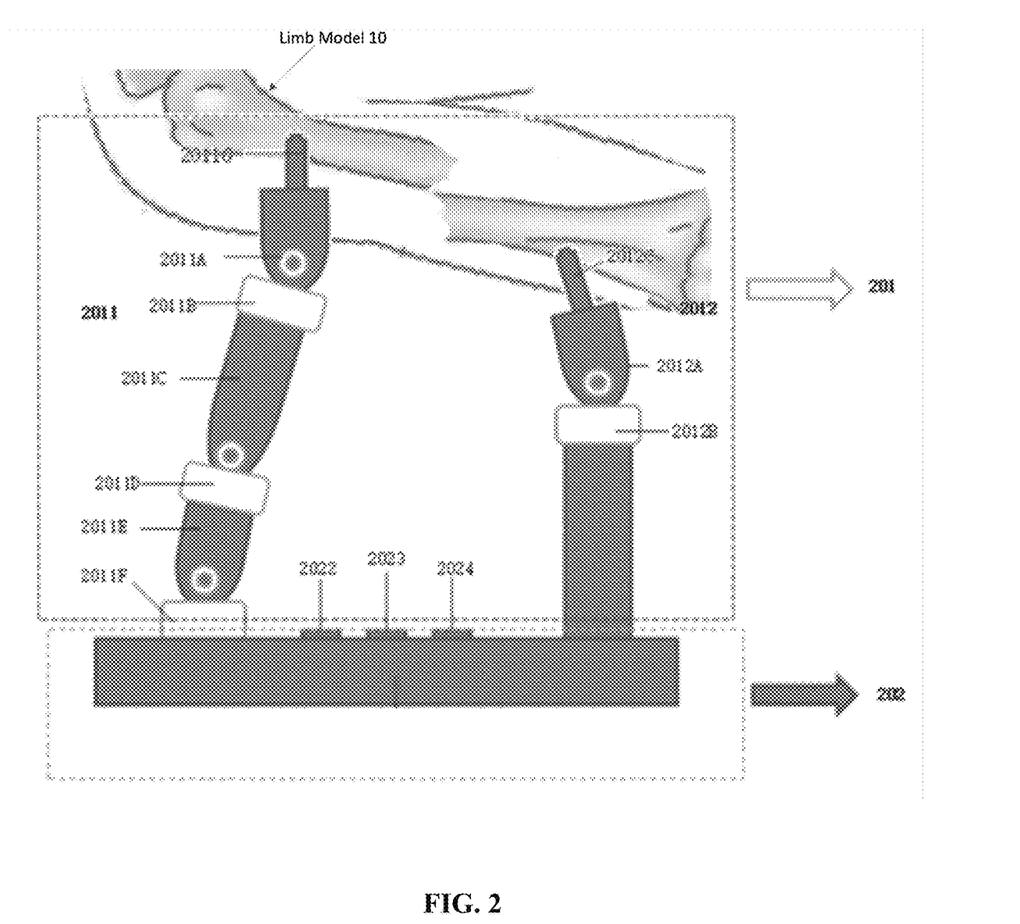
FIG. 2 is an exemplary structural diagram of a fracture reduction platform in FIG. 1.

An exemplary structure of the fracture reduction platform 20 according to an embodiment of the present invention is illustrated in FIG. 2. The fracture reduction platform 20 may include the base 202 and the robotic arm section 201, as indicated in FIG. 2.

The robotic arm section 201 may include: a first robotic arm 2011 that is configured to fix the limb model, and may be provided with three swing joints 2011A, 2011C, 2011E and three rotation joints 2011B, 2011D, 2011F for movement in any direction along three axes of a space; and a second robotic arm 2012 that is configured to fix the limb model, and may be provided with a swing joint 2012A and a rotation joint 2012B for moving with movement of the limb model in a sagittal axis, a coronal axis, and a vertical axis (i.e., X, Y, and Z axes) along with the first robotic arm 2011. The numbers of swing joints and rotation joints of the first robotic arm 2011 and the second robotic arm 2012 can be increased or decreased depending on specific requirements. Likewise, the second robotic arm 2012 may also be provided with three swing joints and three rotation joints, for example.

Both the first robotic arm 2011 and the second robotic arm 2012 are used to fix the limb model (not shown). An end of the first robotic arm 2011 is provided with an engagement nail 2011G, and an end of the second robotic arm 2012 is provided with an engagement nail 2012C. Those skilled in the art could understand that the engagement nails 2011G and 2012C may be inserted into corresponding eyelets on the limb model and fixed in a conventional manner. Therefore, as a user performs operations, such as squeezing, kneading, pinching, pressing, twisting and the like, on the limb model, the user's actions will be transformed into motions of the first robotic arm 2011 and the second robotic arm 2012. It is contemplated by those skilled in the art that the limb model may be fixed to the first and second robotic arms in other manners, which all fall within the protection scope of the present invention.

According to the present invention, the swing joint means a mechanical joint that swings in a fixation axis, and the rotary joint means a mechanical joint that performs a rotational movement in a longitudinal axis.

According to an embodiment of the present invention, the first robotic arm 2011 may be configured to fix a distal end of the fracture of the limb model, and the second robotic arm 2012 may be configured to fix a proximal end of the fracture of the limb model. In terms of fracture reduction, the distal end of the fracture of the limb refers generally to a lower end, i.e., an end that is distal to the heart, and the proximal end of the limb refers to an upper end, i.e., an end that is proximal to the heart, which is comparatively fixed relative to the distal end of the fracture. A reduction operation may be performed from the distal end of the fracture toward the proximal end of the fracture, for example, as the fracture reduction is carried out.

By randomly performing operations such as lifting, squeezing, pressing and rotating and the like in the sagittal axis, the coronal axis and the vertical axis (i.e., X, Y, Z axes) on the limb model, the first robotic arm 2011 and the second robotic arm 2012 of the robotic arm section 201 can rotate and swing in directions along the three axes of the space along with the movement of the limb model.

According to the present invention, the base 202 may include a component for controlling data transmission to and from the control unit 30, a switch component for power supply, and the like, which are disposed on the base 202.

The components disposed on the base 202 may include, for example, a data interface (a USB data interface, for example) 2022, a power interface 2023, a power switch 2024, and the like. According to the present invention, the data interface 2022 can, for example, transmit motion trajectory data of the robotic arm section 201 to the control unit 30 for real-time performance and recording. Moreover, the control unit may further transmit instructions to the robotic arm section 201 via the data interface 2022 to control the movement of robotic arm section 201. The power interface 2023 is configured to be connected to an external power source to supply power to the robotic arm section 201. The power switch 2024 is used to switch on or off power supplying from the external power source to the fracture reduction platform 20. The present invention is not limited to wired data transmission or interfaces, and data transmission between the control unit 30 and the base 202 can be implemented via a wireless communication network, such as WIFI, 3G, 4G, Bluetooth, and the like.

According to the present invention, the control unit 30 is coupled to the fracture reduction platform 20, and is configured to simulate and present the effect of movements of the robotic arm section on the limb model based on the motion of the robotic arm section 201. Presenting of movements of the robotic arm section may include, for example, simulating and displaying on the display the effect of the movement of the robotic arm on the limb model during the fracture reduction operation, and reproducing the movement of the robotic arm section by controlling the movement of the robotic arm section thereby reproducing the generated effect on the limb model.

Figure 3:
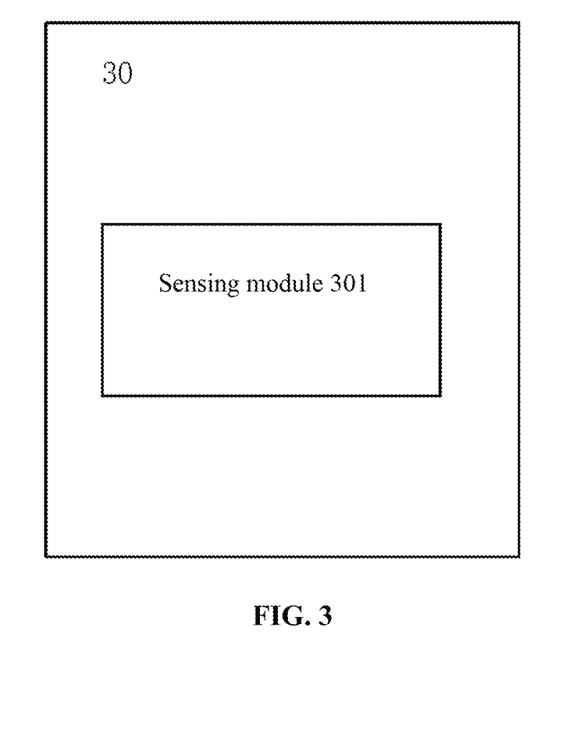
FIG. 3 is an exemplary structural block diagram of a control unit in FIG. 1.

FIG. 3 is an exemplary structural block diagram of the control unit in FIG. 1. As shown in FIG. 3, the control unit 30 may include a sensing module 301 for sensing the movement of the robotic arm section 201, for example, the movement of the robotic arm section while the user is performing the fracture reduction operation. According to the present invention, the sensing module 301 may include, for example, a sensor or an inductor used for sensing the movements of the rotation joints and swing joints of the first robotic arm 2011 and the second robotic arm 2012 of the robotic arm section 201. The motion trajectory data of the rotation joints and swing joints of the first robotic arm 2011 and the second robotic arm 2012 induced by the inductor can be transmitted to the control unit 30 via, for example, a data interface 2022 disposed to the base 202 of the fracture reduction platform 20 such that the control unit 30 can process these data. The processing may include, but is not limited to, data storage, data playback and data feedback, among other things. The inductor may include, but is not limited to, an angle sensor, a displacement sensor, a speed sensor, an acceleration sensor, etc.

Figure 4:
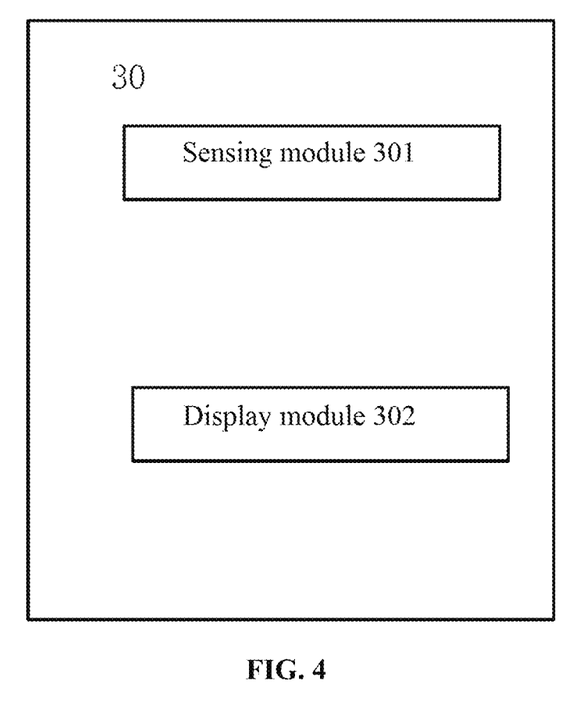
FIG. 4 is another exemplary structural block diagram of the control unit in FIG. 1.

FIG. 4 is another exemplary structural block diagram of the control unit in FIG. 1. As illustrated in FIG. 4, the control unit 30 may include a display module 302 in addition to the sensing module 301 as indicated in FIG. 3. The display module 302 may be coupled to the sensing module 301 and be configured to display the spatial movement of the fractured end of the fracture site of the limb model based on the movement of the robotic arm section 201 sensed by sensing module 301. According to the present invention, the motion trajectories of the robotic arm section 201 sensed by the sensing module 301 can be processed by a processor such that the user's manipulation states of the fracture reduction operation and sophisticated movement status of fractured end in the space can be shown via software on the display module 302 in real time. In this way, the accuracy of the fracture reduction operation performed by the user can be fed back in a timely manner. According to the present disclosure, the display module 302 may include any display device commonly used in the art, such as but not limited to a display of a personal computer, a display of a tablet computer, and/or the like.

According to a preferred embodiment of the present invention, the training device 1 may further include a fracture model unit (not shown in the figure). The fracture model unit is configured to store a fracture model corresponding to the limb model. The fracture model may include, but is not limited to, the type of the limb model (for example, arm, leg bone, etc.), length, fracture position, fracture type (for example, breaking, and comminution), breaking angle, and other common parameters, for example. The fracture model can be preset and selected by the user in use; and/or an interface can be provided for the user to input and customize the fracture model, so as to increase the convenience of using the system.

The control unit (for example, an intelligent processor) can simulate and present the effect of the movement of the robotic arm section on the limb model based on both the fracture model and the movement of the robotic arm section. As an example, the control unit can simulate and display the impact of current user operation (corresponding to the movement of the robotic arm section) on the limb model, depending on either the type of fracture or parameters of the limb model fixed to the current robotic arm section and fracture-related parameters, in conjunction with the received movement parameters of the robotic arm section. For example, as the user conducts a squeezing action on the limb model, the control unit performs a corresponding action of squeezing the broken bone parts of the fracture model together by sensing the movement of the robotic arm section. As the user conducts a twisting action on the limb model, the control unit performs a corresponding action of twisting the broken bone parts of the fracture model by sensing the movement of the robotic arm section. In addition, the user can be aware of the effect created by the manipulations of current operation through displaying by the control unit, such as whether the broken bone parts are squeezed in place, whether the broken bone parts have been aligned by rotation, and so on.

According to the present invention, the user who may perform the fracture reduction operation can correct the fracture reduction operation based on the spatial movement of the fractured end displayed on the display module 302. The user who may perform the fracture reduction operation may be a clinician or an expert who has fracture reduction experience, or may be a student or an intern who is learning the fracture reduction operation, and the like.

The training device according to the present invention can grasp the processing status of the fracture reduction operation in time, so as to adjust or correct the fracture reduction operation, as compared with the fact that it is difficult to visually observe the fractured end during closure manipulative reduction in the prior art. The difficulty for beginners to master the direction and strength of the manipulation can therefore be reduced, and the training effect of the operator can be greatly improved.

Figure 5:
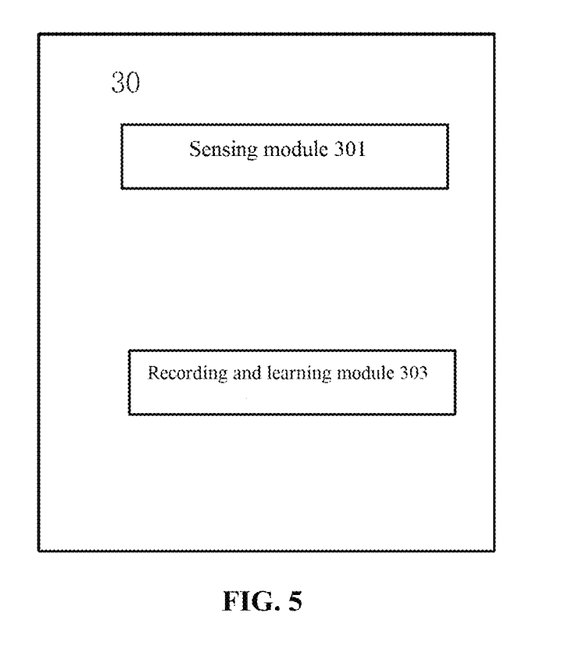
FIG. 5 is yet another exemplary structural block diagram of the control unit in FIG. 1.

FIG. 5 is another exemplary structural block diagram of the control unit in FIG. 1. As shown in FIG. 4, in addition to the sensing module 301 in FIG. 3, the control unit 30 may further include a recording and learning module 303, which is configured to operate in a recording mode where the recording and learning module 303 can store the movement of the robotic arm section 201 as a template, and in a learning mode where the recording and learning module 303 can drive the robotic arm section 201 to move according to the stored template, respectively.

According to the present invention, the recording and learning module 303 may include a storage medium in which the movements of the robotic arm section 201 while a master, clinician, or expert with proficient bone setting manipulations is performing a fracture reduction operation may be recorded and stored in the recording mode. The storage medium may include any storage medium known in the art, which will not be repeated herein. In the learning mode, the recording and learning module 303 can drive the robotic arm section 201 to move according to the template stored in the storage medium to reproduce the reduction operation of the master, clinician and expert with proficient bone setting manipulations. As a result, beginners such as students, apprentices, and internships who are learning the bone setting manipulations can learn the fracture reduction operation by sensing the movement of the limb model fixed to the robotic arm section 201.

According to an embodiment of the present invention, the training device 1 may further include a motor (not shown in the figure), which is coupled to the robotic arm section 201 and is further coupled to the control unit 30, and is configured to drive the robotic arm section 201 to move according to the template under control of the recording and learning module 303 of the control unit 30. The motors may correspond to the degrees of freedom of the robotic arm section. For example, eight motors may be provided for the robotic arm section of FIG. 2, corresponding to the swing joints and the rotation joints of the first robotic arm 2011 and the second robotic arm 2012, respectively. According to the present invention, the recording and learning module 303 of the control unit 30 is configured to generate a control instruction based on the movement of the robotic arm section 201 stored as the template to control the motor to drive the robotic arm section to move following the template. Therefore, the user can feel the movement recorded by the template by placing his or her hand on the limb model, and learn how to perform the fracture reduction operation.

The ability to record and reproduce fracture reduction operations of professionals such as teachers, clinicians and the like makes it possible for the interns or students as beginners to repeatedly learn and feel the sequence, direction and strength of fracture reduction operations performed by professionals during training, thereby effectively improving the training effect. In addition, the bone setting manipulations are enabled to be more objective, normalized, and digitized by digitizing the manipulations of fracture reduction operation of one or more teachers, clinicians and other professionals and performing recording and data analysis on the digitized operation information. The further development of bone setting manipulations can be significantly promoted.

Figure 6:
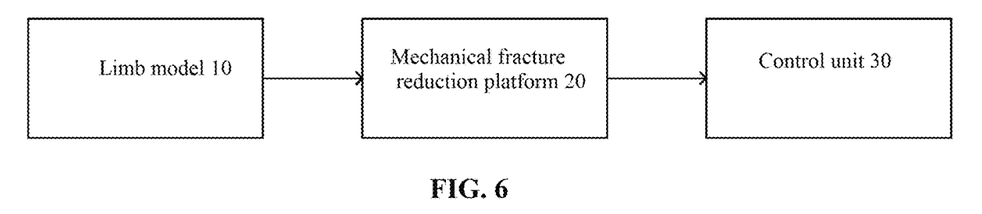
FIG. 6 illustrates another exemplary block diagram of the training device for fracture reduction according to an embodiment of the present invention.

An exemplary structural block diagram of the training device for fracture reduction according to another embodiment of the present invention is illustrated in FIG. 6. As shown in FIG. 6, the training device 2 according to the embodiment of the present invention may include the limb model 10, which may include bone parts and soft tissue parts, for example, in addition to the fracture reduction platform 20 and the control unit 30 similar to FIG. 1.

According to an embodiment of the present invention, for example, a part of the upper limb or the lower limb that conforms to the manipulative reduction operation can be simulated, for example, to make a model similar to a human limb. The bone parts can be made of harder materials similar to human bones in such a way that the shape and size of the bone parts are similar to those of human bones. Afterwards, one or several sites of the bone parts may be caused to fracture, such as broken humeral shaft fractures, ankle fractures and/or the like. A rubber material with hardness similar to that of human muscles can then be adopted to wrap around the bones. For example, a rubber material with a touch similar to the skin, hardness similar to muscles, and the resistance when pulled longitudinally equivalent to the elasticity of human muscles can be used to make the soft tissue part. According to the present invention, the appearance and color of the soft tissue part can be set according to the appearance of the limbs of the yellow race, and can of course be set according to the appearance of the limbs of other races. Then, a link nail, for example, can be used to fix the soft tissue part onto the bone parts in such a way that the limb model is completely close to the human limb in terms of appearance, size, feel, and strength.

The user may perform, on the limb model, training of various reduction operations such as lifting, squeezing, pressing and rotating conducted randomly in the sagittal axis, coronal axis and vertical axis (i.e., X, Y, Z axes).

While the structure and configuration of the limb model are exemplified above, the present invention is not limited thereto. It will be appreciated by those skilled in the art that the limb model 10 for fracture reduction according to the present invention can alternatively employ other types of limb models known in the art according to actual requirements, as long as it may include the fracture site(s) and can be used by the beginners to implement training and learning of fracture reduction.

Figure 7:
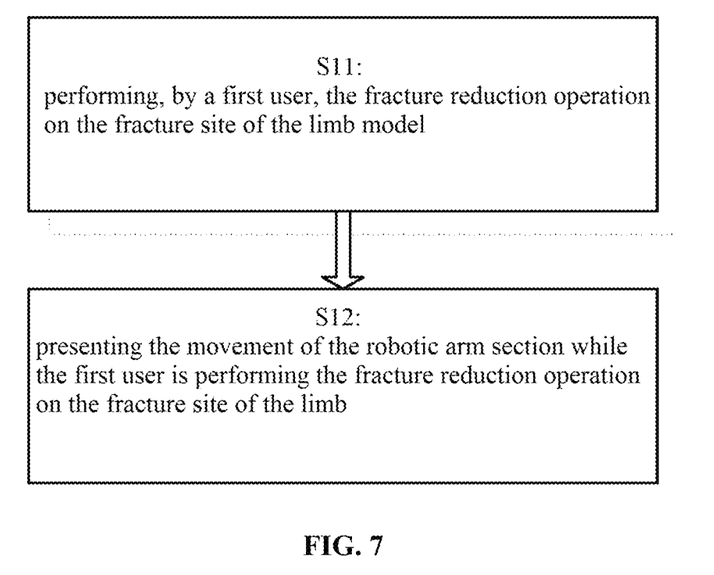
FIG. 7 illustrates an exemplary process of a training method for fracture reduction according to an embodiment of the present invention.

As illustrated in FIG. 7, a training method for fracture reduction according to another embodiment of the present invention is further provided. The method may include the following steps.

In step S11, a fracture reduction operation on a fracture site of the limb model is performed by the first user.

In step S12, the generated effect on the fracture site while the first user is performing a fracture reduction operation on the fracture site of the limb model is simulated and presented.

According to an embodiment of the present invention, the step of presenting may include: sensing the movement of the robotic arm section while the first user is performing a fracture reduction operation on the fracture site of the limb model.

According to an embodiment of the present invention, the training method for fracture reduction may further include: storing, as a template, the movement of the robotic arm section while the first user is performing the fracture reduction operation.

According to an embodiment of the present invention, the training method for fracture reduction may further include: driving the robotic arm section to move according to the stored template.

According to an embodiment of the present invention, the step of simulating and presenting may include: displaying the spatial movement of the fractured end of the fracture site of the limb model on the display module, based on the sensed movement of the robotic arm.

According to an embodiment of the present invention, the training method may further include: correcting the fracture reduction operation based on the displayed spatial movement of the fractured end of the fracture site of the limb model.

The training device and training method for fracture reduction according to the present invention achieve at least one of the beneficial technical effects as follows. The drawbacks that students or interns cannot perform repeated manipulation exercises on patients (human bodies) can be overcome. The fracture reduction operation performed by the operator can be fed back in real time, which enables the operator to correct or adjust the fracture reduction operation in real time based on feedback, such as the direction and strength of the fracture reduction manipulation, thereby greatly improving the effect of training operator. The reduction manipulations of teachers, clinician or famous doctor can be recorded and reproduced to facilitate the learners to feel the sequential direction and strength of the manipulations repeatedly, thereby effectively improving the training effect.

The above descriptions are only the preferred embodiments of the present invention and are not intended to limit the present invention. Any modification, equivalent replacement, improvement and the like made within the spirit and principle of the present invention shall be included in the protection scope of the present invention.

Finally, it should be noted that the above descriptions are only preferred embodiments of the present invention and are not intended to limit the present invention. While the present invention has been described in detail with reference to the foregoing embodiments, it is nevertheless possible for those skilled in the art to make modifications to the technical solutions described in the foregoing embodiments, or make equivalent replacement for some of the technical features. Any modifications, equivalent replacements, improvements and/or the like, made within the spirit and principle of the present invention, should be included in the protection scope of the present invention.

What is claimed is:

1. A training device for fracture reduction, characterized by comprising:
    a fracture reduction platform that includes a base and a robotic arm section fixed on the base, the robotic arm section being configured in such a manner that a limb model can be mounted thereon; and
    a control unit that is coupled to the fracture reduction platform and is configured to, based on a movement of the robotic arm section, simulate and present an effect of the movement of the robotic arm section on the limb model,
    wherein the control unit includes:
        a sensing module that is coupled to the robotic arm section and is configured to sense the movement of the robotic arm section, and
        a recording and learning module that is configured to operate in a recording mode where the recording and learning module can store the movement of the robotic arm section as a template and in a learning mode where the recording and learning module can drive the robotic arm section to move according to the stored template.

2. The training device according to claim 1, characterized in that the robotic arm section comprises:
    a first robotic arm that is used to fix the limb model, the first robotic arm is provided with three swing joints and three rotation joints so as to move in any direction along three axes of a space; and a second robotic arm that is used to fix the limb model, the second robotic arm is provided with a swing joint and a rotation joint.

3. The training device according to claim 1, characterized in that the control unit further comprises: a display module that is coupled to the sensing module, and is configured to, based on the movement of the robotic arm section sensed by the sensing module, display a spatial movement of a fracture site of the limb model.

4. The training device according to claim 1, characterized by further comprising a motor coupled to the robotic arm section, and the recording and learning module controls the motor to drive the robotic arm section to move according to the template.

5. The training device according to claim 1, characterized by comprising a fracture model unit configured to store a fracture model corresponding to the limb model, and the control unit simulates and presents the effect of the movement of the robotic arm section on the limb model based on the fracture model and the movement of the robotic arm section.

6. The training device according to claim 1, characterized by further comprising the limb model including a bone part and a soft tissue part, wherein the bone part includes at least one fracture site.

7. A training method using a training device for fracture reduction and restoration, characterized by comprising:
performing, by a first user, a fracture reduction operation on a fracture site of a limb model, wherein the training device includes:
a fracture reduction platform that includes a base and a robotic arm section fixed on the base, the robotic arm section being configured in such a manner that a limb model is mountable thereon; and
a control unit that is coupled to the fracture reduction platform and is configured to, based on a movement of the robotic arm section, simulate and present an effect of the movement of the robotic arm section on the limb model;

simulating and presenting an effect on the fracture site while the first user is performing the fracture reduction operation on the fracture site of the limb model; and storing, as a template, the movement of the robotic arm section while the first user is performing the fracture reduction operation.

8. The training method for fracture reduction and restoration according to claim 7, characterized in that the step of the simulating and presenting comprises: sensing the movement of the robotic arm section while the first user is performing the fracture reduction operation on the fracture site of the limb model.

9. The training method for fracture reduction and restoration according to claim 7, characterized by further comprising: driving the robotic arm section to move according to the stored template.

10. The training method for fracture reduction and restoration according to claim 7, characterized in that the step of simulating and presenting comprises: based on the sensed movement of the robotic arm, displaying the spatial movement of the fractured end of the fracture site of the limb model on the display module.

11. The training method for fracture reduction and restoration of claim 10, characterized by further comprising: correcting the fracture reduction operation based on the displayed spatial movement of the fractured end of the fracture site of the limb model.

* * * * *